Aug. 10, 1937.   R. W. CLARK   2,089,688
ELECTRODE HOLDER
Filed Dec. 21, 1935
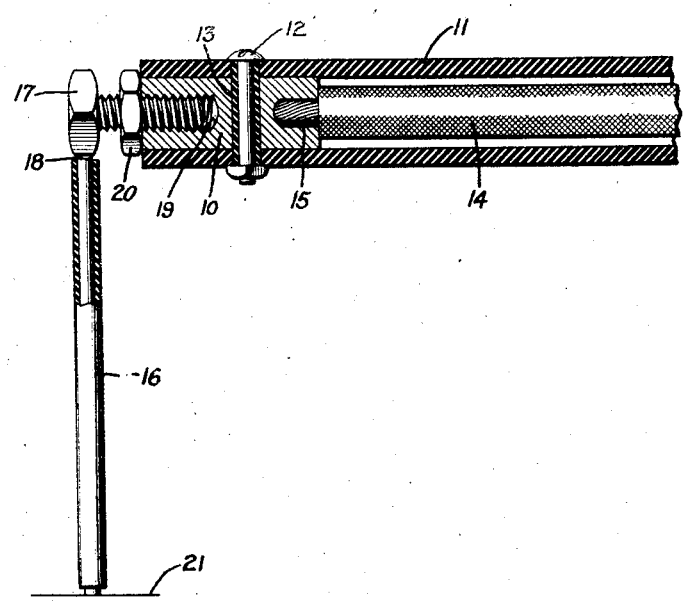
Inventor:
Roger W. Clark,
by Harry E. Dunham
His Attorney.

Patented Aug. 10, 1937

2,089,688

UNITED STATES PATENT OFFICE 2,089,688

ELECTRODE HOLDER

Roger W. Clark, Scotia, N. Y., assignor to General Electric Company, a corporation of New York Application December 21, 1935, Serial No. 55,575

2 Claims. (Cl. 219—8)

My invention relates to arc welding apparatus and more particularly to those tools known as electrode holders. Such tools are employed by arc welding operators for supplying welding current to an arc welding electrode supported thereby and for manipulating said electrode during the welding operation.

It is an object of my invention to provide an electrode holder of improved and simplified construction.

It is a further object of my invention to provide an electrode holder in which the electrode is attached to the holder by welding instead of by mechanical means.

Further objects of my invention will become apparent from the following description taken in connection with the accompanying drawing, the single figure of which illustrates an electrode holder embodying my invention and the manner of attaching an electrode thereto by means of a welding operation.

The electrode holder shown in the drawing comprises a shank or coupling member 10 of electrically conductive material which is supported in the forward end of a tube of fibrous material 11 constituting the handle of the electrode holder. This shank is attached to and held in place in the handle 11 by a bolt 12 which is insulated from the shank by a sleeve of insulating material 13. The end of a welding cable 14 extends through the rear portion of the handle 11 and is electrically connected to the shank 10. In the arrangement illustrated the bared end portion of this cable is inserted in a recess 15 in the shank 10 and electrically and mechanically connected to the shank by soldering, brazing or the like.

The electrode 16 is supported by the holder by being integrally united to a temporary part 17 thereof by means of a weld 18. In the arrangement illustrated the temporary part 17 is a bolt of electrically conductive material which is threaded into a recess 19 in the front end of the shank 10. The bolt is held in place by a lock nut 20 which forces the threads of the bolt and of the recess into firm engagement and thus prevents pitting or sticking of these threads as the result of the flow of welding current through the shank and bolt to the electrode.

The electrode 16 is attached to the electrode holder in the following manner: One end of the electrode 16 is firmly placed against the work 21 and part 17 of the electrode holder is placed against the other end of the electrode, withdrawn to establish an arc, and then again pressed into engagement with this end of the electrode to complete a weld between the portions of the electrode 16 and part 17 which have been raised to a welding temperature by the arc thus established between them. As soon as this weld is made the end of the electrode in engagement with the work is withdrawn therefrom. As only a spot contact is made between the electrode and the work this is easily broken by deflecting the electrode relative to the work.

The welded joint between the electrode holder and the electrode made by this method has a much better electrical conductivity than the mechanical joints between other types of electrode holders and the electrodes supported therein. This reduces heating in both the holder and the electrode attached thereto and greatly reduces the operating temperature of the electrode holder.

An electrode holder embodying my invention is particularly suited for use with coated electrodes, especially heavy coated electrodes. When it is necessary to establish a mechanical contact between such an electrode and its holder at least 1½ in. of one end portion of the electrode must be bared of its flux coating for this purpose. These ends are a substantial part of the total length of the electrode and since they cannot be used for welding constitute a substantial waste of electrode material. By using an electrode holder embodying my invention it is not necessary to bare the ends of a flux coated electrode unless the coating is of extreme thickness, in which case it is necessary to bare only about ¼ to ⅜ of an inch of the end portion of the electrode. During welding with my electrode holder the entire electrode may be consumed due to its manner of attachment to the electrode holder and to the fact that the flux coating extends to its point of attachment. This completely eliminates the waste due to the scrap ends of electrodes which may amount to from 10 to 20 per cent of the electrode used. An electrode holder embodying my invention is also suited for use with uncoated electrodes. During welding such electrodes may be consumed up to their points of attachment with the holder and in this case as in the case of heavy coated electrodes it is not necessary to throw away unconsumed portions of the electrodes.

The part 17 of the holder to which the electrode is welded is only a temporary part of the holder and is detached and thrown away after continued usage has rendered it unsuited for the ready attachment thereto of welding electrodes. It is preferably provided with at least one flat surface portion of a material adapted to be integrally united to the electrode by welding. By using a hexagonal headed bolt as illustrated the six side surfaces of the bolt head as well as the end surface thereof are available for attachment to electrodes. It is not necessary, however, to use a bolt in order to obtain a projecting end portion the sides of which are formed by a plurality of flat surfaces to each of which the end of an electrode may be readily attached by a weld. It is desirable that the temporary part 17 of the electrode holder be detachably supported by the shank of the electrode holder by some suitable separatable fastening means so that this part may be frequently renewed without any great loss of time. Furthermore, the temporary part 17 should be of such a character that it may be cheaply made and, consequently, frequently renewed without materially increasing the cost of welding. An electrode holder of the construction above described is of great utility in performing welding operations such as disclosed in United States Letters Patent 1,041,525, A. P. Strohmenger, Oct. 15, 1912. By welding the electrode to one of the side surfaces of the head of the bolt constituting the temporary part of the holder, the full length of an electrode may be held against the seam in the work to be welded without bending or destroying the end portion of the electrode. The electrode holder is not, however, limited to such usage, since it is also admirably suited for all kinds of arc welding. The advantages of such an electrode holder are most effectively realized when welding with coated electrodes for reasons pointed out above.

While I have shown a particular embodiment of my invention it is to be understood that modified arrangements may be provided without departing from the spirit and scope of my invention.

What I claim as new and desire to secure by Letters Patent of the United States, is:

1. An electrode holder comprising an electrically conductive shank, means for electrically connecting an electric conductor to said shank, and an electrically conductive member electrically connected to and detachably supported by said shank, said member forming a temporary part of said holder and having projecting from said shank an end portion the sides of which are formed by a plurality of flat surfaces to each of which the end of an electrode may be readily attached by a weld.

2. An electrode holder comprising an electrically conductive shank, means for electrically connecting an electric conductor to said shank, and an electrically conductive bolt forming a temporary part of said holder, said shank having a threaded recess into which said bolt is screwed and said bolt having a head provided with a plurality of flat surfaces to which the end of an electrode may be readily attached by a weld.

ROGER W. CLARK.